United States Patent [19]

Muller

[11] 3,912,876

[45] Oct. 14, 1975

[54] FREQUENCY DIVISION SWITCHING NETWORK

[75] Inventor: Jean Jacques Muller, Garches, France

[73] Assignee: International Standard Electric Corporation, New York, N.Y.

[22] Filed: Mar. 29, 1974

[21] Appl. No.: 455,984

[30] Foreign Application Priority Data

Apr. 5, 1973 France .............................. 73.12264

[52] U.S. Cl......... 179/41 A; 179/18 FG; 179/15 FD

[51] Int. Cl.$^{2}$.......................................... H04M 7/16

[58] Field of Search......... 179/41 A, 18 GF, 15 FD, 179/82; 343/200; 333/7 R

[56] References Cited

UNITED STATES PATENTS 3,295,133 12/1966 Emerson et al..................... 333/7 R

*Primary Examiner*—Kathleen Claffy
*Assistant Examiner*—Gerald L. Brigance
*Attorney, Agent, or Firm*—James B. Raden; Marvin M. Chaban

[57] ABSTRACT

Disclosed is a switching network usable in exchanges of a telecommunications system using frequency division switching. The input and output terminal circuits are interconnected by means of a transmitter to receiver coupling preferably using the air space between the transmitter and receiver as the medium linking the transmitter and receiver. The frequency of the receiver is tuned to the frequency of the transmitter by suitable control circuits. The switching is performed in an enclosed electromagnetically shielded room. Alternatively the principle could be employed with light waves using laser technology or by frequencies transmitted along solid wires.

11 Claims, 2 Drawing Figures

FREQUENCY DIVISION SWITCHING NETWORK

BACKGROUND OF THE INVENTION

The purpose of a telecommunication exchange is to provide interconnections between remote points which are terminated in the exchange at terminal circuits. The terminal circuits are linked to one another via either electrical hardwired connections or by way of electromagnetic or electronic switch members. For that purpose, those switching paths or interconnections are established between terminal circuits located on the exchange, the interconnections serving to route information between the switched terminal circuits on request. In the exchange, the switching network is provided to establish interconnections between terminal circuits, and it is therefore provided with a switching network capable of interconnecting those terminal circuits on request.

The most usual switching system is the space-division switching network. In theory, a two-way space-division system switching network comprises separate channels for each direction in the form of a matrix having N inputs, N outputs and up to N (N−1) crosspoints, each crosspoint being able to provide a one-way connection from an input to an output where the exchange including that network comprises N terminals circuits, each being connected to an input and an output of the matrix. In this way, it is possible to have a non-blocking network with total direct accessibility which can provide a maximum number of N/2 simultaneous two-way communications.

Each one-way communication occupies a separate path which is established through the switching network between those terminal circuits which are involved for the duration of that communication.

Information to be communicated is transmitted out of the exchange by way of wire networks or by electromagnetic radiation. Where the transmission must simultaneously transmit information concerning several communications which have to simultaneously pass through the same telecommunication exchanges, the networks or equipment become cumbersome and expensive.

In time-division switching, known multiplexing techniques are used. In these systems, a plurality of signals are produced from each terminal and are inerleaved in a timed sequence. The position number of signals is noted and a sampling frequency is derived for extracting signals from the designated positions.

The samples representing several communications may be transmitted on a same medium by correctly multiplexing those samples in time-division multiplex. In that process, a synchronizing gate is cyclically allotted to the transmission of the sample involved in a communication, that gate having a fixed time-position within the cycle.

However, a system using these time-division techniques remains incomplete as long as a space-division switching network has not been provided which permits intermediate exchanges to switch the received samples in the form as they have been transmitted and received.

Also known are time-division switching systems which permit temporary storage of received samples, regardless of their arrival time, for transmitting the stored samples to the corresponding transmission linkage at times which correspond to the synchronizing gates which are allotted to them in those linkages.

Theoretically, the switching network in a time-division exchange is in the form of a N-row memory. That memory sequentially receives N discrete samples in a predetermined reception order and transmits those N samples in a transmission order different of the reception order. In this way, a non-blocking network having total direct accessibility capable of handling N/2 simultaneous two-way communications is provided.

For well-known reasons, space-division or time-division switching networks are not usually implemented by means of a sigle space-division matrix or a single time-division memory, but instead small size unit combinations are preferably utilized. The smaller size units usually lower the capability as far as traffic flow is concerned. The lower traffic capacity is often compensated by increased reliability for the system and a smaller number of switching components. In a large system, control devices are multiplied since each communication passes through several network stages instead of a single stage, even for relatively small capacities. As a result, those time-division or space-division networks are complex, cumbersome and costly.

SUMMARY OF THE INVENTION

It is known that techniques employing electrical or electromagnetic radiation waves permit the establishment of communications between remote points without physical connection members such as wires, either in a one-way manner as in radio broadcasting, or a two-way manner as in radio communication.

It is also known that it is possible to tune the frequency of the remote receiver (s) to the frequency of the transmitter located at the point originating that information. In the present invention, I have joined these known principles into a switching network usable for switching communication paths within a telecommunications exchange. By using my approach, it is thus possible to interlink a large number of communications or calls by using a separate frequency or band for each communication.

For well-known reasons of frequency transmission and allocation, radio frequencies and systems using these frequencies are reserved for certain specific communications providing obvious advantages such as for calls with or between mobile bodies, such as vehicles, ships and the like.

To overcome the drawbacks of either space-division or time-division switching systems, a major object of the present invention is to provide a new frequency division switching system in a telecommunication exchange using radio frequency transmission within an enclosed environment simulating free space.

According to another feature of this invention, the switching means basically comprise radio transmitter units and radio receiver units having their antennas contained in a common closed environment, such as a room electromagnetically isolated from outside space, with the radio units being connected to the terminal circuits, preferably externally of the room.

According to another feature, control means are provided to obtain the radio connection between a transmitter unit and a receiver unit for a selected link obtained by tuning the frequency of at least one of the two involved radio units onto the frequency being used by the other.

According to another feature of this invention, a system is provided in which the frequency selected for a radio connection between a transmitter unit and a receiver unit has a fixed characteristic of one of the two units, the other unit being tuned to that frequency by suitable control means.

According to a further feature of this invention, the switching environment housing the radio units is anechoic as far as radio transmission is concerned, and receiver unit antennas are in direct line of sight with transmitter unit antennas.

Still according to another feature of this invention, the switching system comprises at least a particular local terminal circuit within the switching room for exchanging signaling information by a radio channel between the control means and terminal circuits other than that particular local terminal circuit.

According to another feature of this invention, the switching system comprises a terminal circuit located outside the switching room including either transmitter unit or receiver unit or both, those units being connected by coupling links to their antennas located inside the exchange switching room.

Other features of this invention will appear more clearly from the following description of an embodiment, the said description being made in conjunction with the drawings which follow.

DETAILED DESCRIPTION OF THE DRAWINGS

Figure 1:
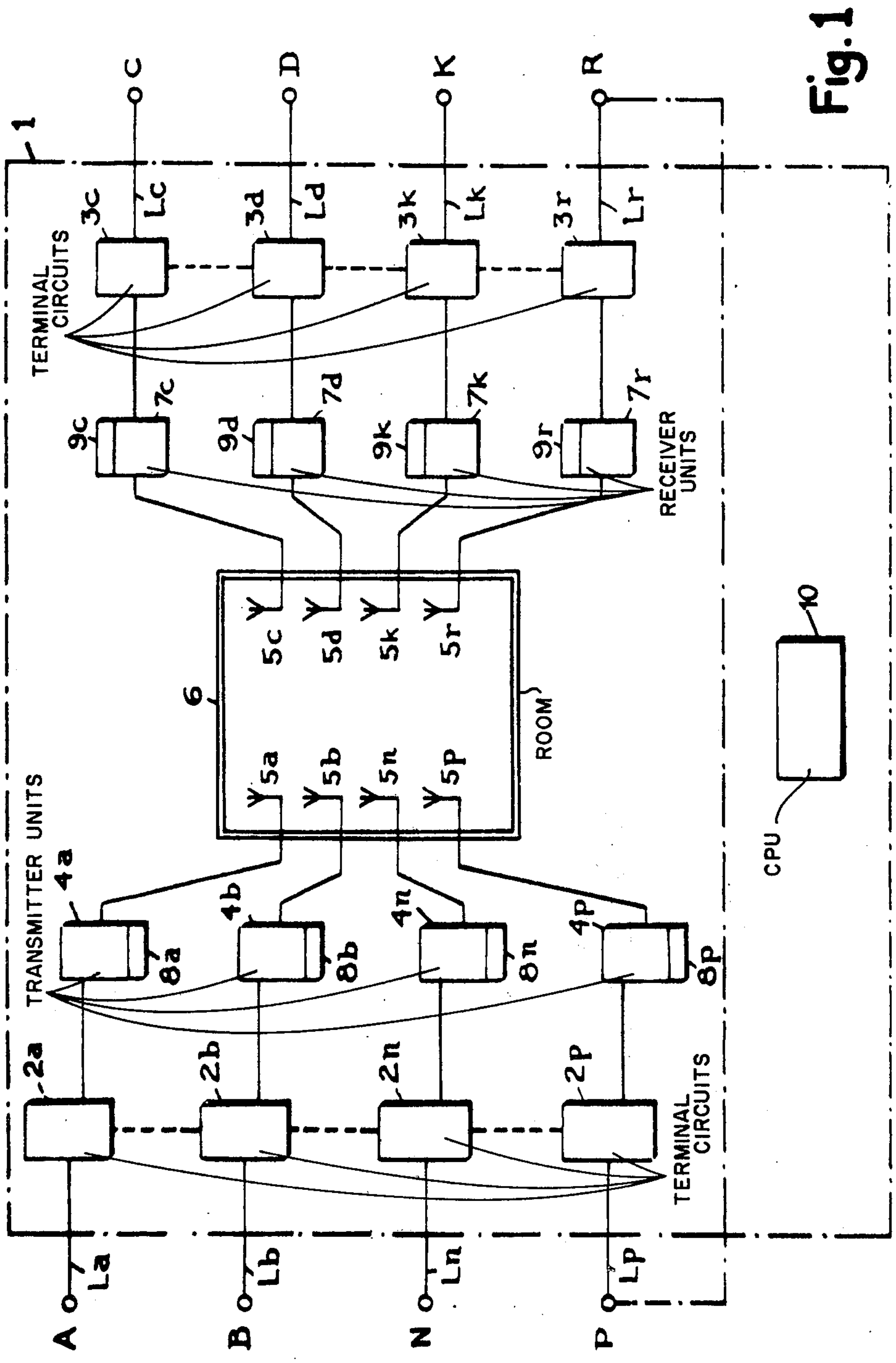
FIG. 1 is a schematic diagram of a switching system according to this invention.

In FIG. 1, the exchange 1 is connected to a plurality of remote points, such as A, B, C, D, K, N, P and R via electrical or radio links or channels L which are connected to as many terminal circuits 2 or 3.

To explain the invention in its simplest form, the transmission links are assumed to be one-way links, terminal circuits 2 are assumed to be only able to receive information from links L connected thereto, and terminal circuits 3 are assumed only able to transmit information to links L connected thereto, provided that it is understood that by combining the use of a terminal circuit 2 with a terminal circuit 3 and their respective links L produces a two-way transmission link.

Within exchange 1, each terminal circuit 2 is connected to a radio transmitter unit 4 and each terminal circuit 3 is connected to a radio receiver unit 7. Other combinations or arrangments of links between circuits 2 and units 4, and between circuits 3 and units 7 are apparent; however, during this phase of the description, only a simple relation between units and terminal circuits has been assumed. Thus, it will be considered that each terminal circuit 2 is connected to its own unit 4 and that each terminal circuit 3 is connected to its own unit 7. Radio units 4 and 7 are conventionally connected to antennas 5, each antenna being assumed to correspond to its connected units for this simplified description.

The antennas 5 are located in a single enclosed space such as room 6 designed to reproduce the optimum radio wave space propagation conditions in a limited volume. The room 6 is isolated from outside space as far as radio propagation is concerned, in such a manner that a wave radiated in room 6 may reach any point within that room. As a result, the transmission from any unit 4, such as the unit connected to antenna 5*a*, may be received by any receiver unit 7, such as 7*r*, when the transmission frequency of unit 4*a* is identical to the reception frequency of unit 7*r*. Thus it is possible to link by radio the terminal circuits 2*a* and 3*r* through their respective radio units 4*a* and 7*r*.

Due to the fact that the purpose of the switching system is to provide means capable of connecting each point with a plurality of other points, similar to that of conventional switching systems, it is thus necessary that the operating frequency of any transmitter unit 4 can be tuned to correspond with any receiver unit 7 and in a like manner that any unit 7 can be tuned to correspond with any unit 4.

Any suitable means may be provided for such tuning, such as providing each unit 4 with a frequency tuning device 8 and each unit 7 with frequency tuning device 9 which make a tuning possible to any frequency utilized in the switching system. The tuning device may also be provided to only one of the two groups of units, either to transmitter unit 4 or receiver unit 7, a fixed frequency being allotted to each unit of the other group.

Using this principle, it is clear that assuming that N units 4 and N frequencies are available, a maximum of either N simultaneous one-way communications or N/2 simultaneous two-way communications may be established.

Since present day frequency synthesizers for the radio communication field provide a very large number of frequencies, large capacity switching exchanges are possible by using the principles of the present invention.

Due to the large number of possible linkages within a switching room, the control of the switching system and, in particular, the frequency tuning control means of the radio units may be controlled by a computer (CPU) 10. Such computer assemblies may be of the same type as those presently used in common control telephone switching systems in view of similarity of the operations to be performed.

In a system of the type described, either analog information or digital information may be switched provided that the frequency band used for transmitting the information is suitable, for example, provided that frequency channel spacing may be modified.

Any techniques well-known in radio communication field, such as single side band or double band amplitude modulated carrier wave system or pulse code modulation system may be selected for transmitting coded speech signals or data messages.

The switching room 6 should have a number of specific characteristics. As previously mentioned that room must be isolated as far as radio propagation is concerned to preclude any penetration of interference electromagnetic waves from outside the room. Further transmission of waves radiated by transmitter unit antennas in the room should be prevented from being transmitted outside the room. This condition is met when room 6 constitutes a Faraday cage.

However, waves radiated inside room 6 by transmitter unit antennas 5, which are assumed to be non-directive, must not be reflected by room walls. Reflection of the waves would result in phase distortions for signals received by receivers 7. As a result, according to this invention, the room is designed as a radio anechoic room with its walls constructed to absorb impinging radio waves. The wall absorption characteristic may be obtained by conventional processes utilized in antenna measurement room or sound chambers usually by providing insulating layers or coatings and properly mounting the insulating layers. Attenuation between any transmitting antenna to any receiving antenna is defined in such a room by a $1/R^2$ law where R indicates the distance between considered antennas — exactly as in free space. Due to wall absorption characteristics, receiver unit antennas, such as 5*r* for unit 7*r* should be in direct line of sight with transmitter unit antenna, such as 5*a* for unit 4*a*. Due to the physical proximity of the various antennas and the occurrence of simultaneous radiations, intermodulation phenomena generating crosstalks will necessarily occur. Indeed, all the electromagnetic fields generated by those transmitter unit antennas which are operating at a same time simultaneously affect each other's operational receiver unit. Consequently, a first intermodulation effect occurs if certain transmission frequencies are multiple of other transmission frequencies. This may be easily overcome by selecting all the transmission frequencies inside a same octave and by providing antennas with low-pass filters.

A second intermodulation effect occurs when receiver units have non-linear response characteristics which results in the occurrence of intermodulation products having frequencies as $2f1-f2$, $3f1-2f2$, . . . , $pf1-qf2$ (with $p-q=1$). This effect may be overcome by equipping receiver units with linear frequency converters which results in an intermediate frequency the desired modulated frequency being filtered at that intermediate frequency, and all other frequencies being eliminated.

A third intermodulation effect occurs from transmitter coupling which results in each transmitter transmitting intermodulation waves combining its transmission frequency with that of at least a close transmitter received by it to produce products having frequency of the type $mf1-nf2$. This may be overcome by decoupling the transmitter units one from the other, for example by inserting attenuators serially connected with transmission antennas which is possible in view of the low attenuation between transmitter and receiver units whose respective antennas are very close in switching room 6.

If linkages between transmitter units 4 and receiver units 7 were not made in a random manner, certain linkages could be privileged.

In the general case which is hereby considered, the most possible equal reception level must be provided for all the receiver units 7 whatever is the considered transmitter unit 4. As a result, powers radiated by transmission antennas are selected practically equal and the various antennas are preferably arranged in such a manner that the distance between any transmitter unit antenna and any receiver unit antenna is the most possible constant in order to prevent a failure in linkup.

In a preferred embodiment, room 6 has a lengthened prismatic or cylindrical shape with transmission antennas— such as 5*a*, 5*b*, 5*n*, 5*p* — located at one end of room 6 and reception antennas—such as 5*c*, 5*d*, 5*k*, 5*r*— located at the other end, for example within a common circular plane diametrically opposed.

Figure 2:
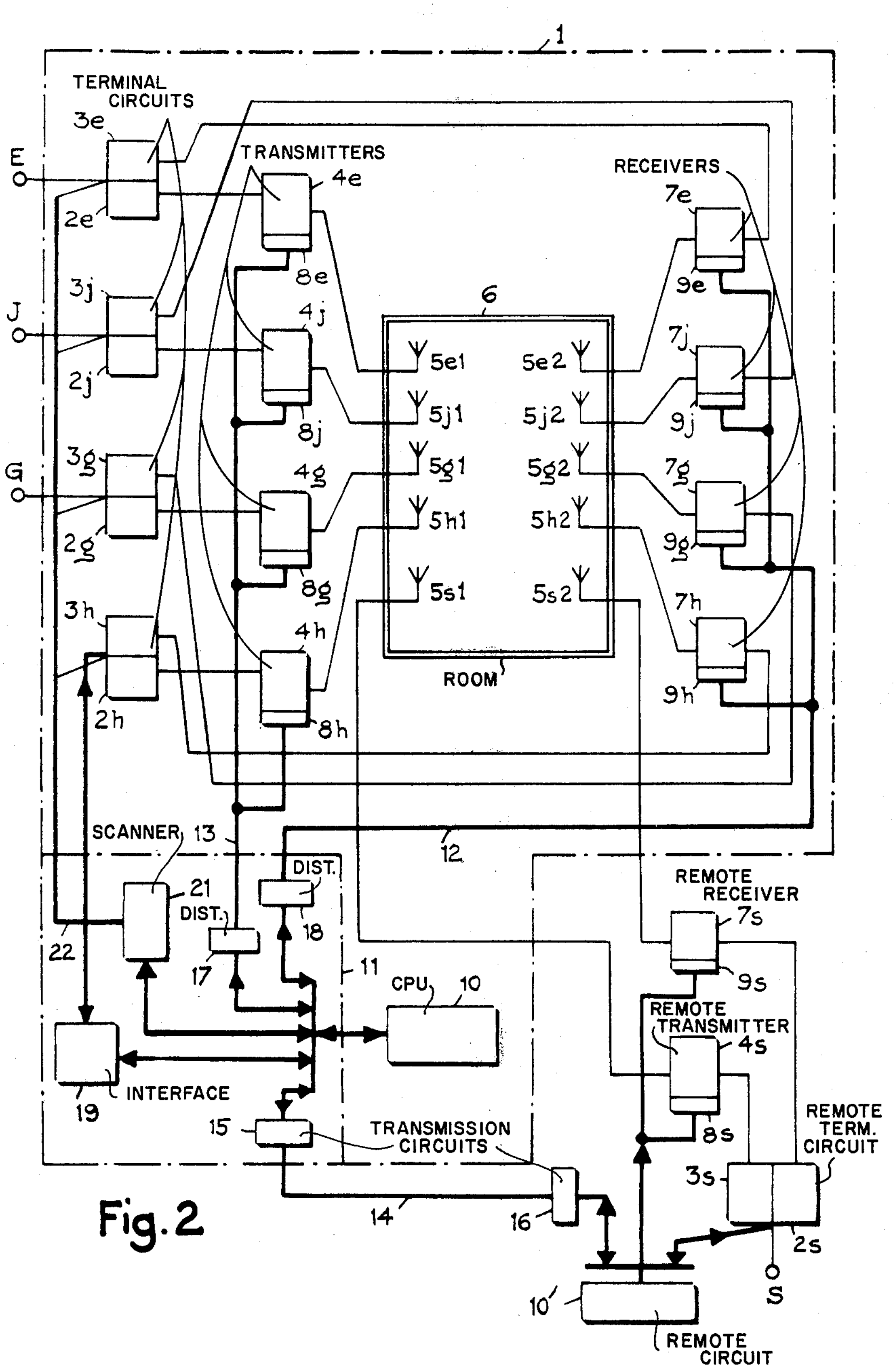
FIG. 2 is a schematic diagram of an embodiment of this invention as applied to a subscriber telephone exchange.

FIG. 2 shows a diagram of a switching system according to this invention, designed for use with a common control subscriber telephone exchange. As previously mentioned, switching room 6 includes antennas of transmitters 5 and receivers 7 each associated with terminal circuits 2–3 belonging to that exchange. For example, terminal E corresponds to a subscriber set and circuit 2*e*–3*e* corresponds to the line circuit associated with that set. Circuit 2*e*–3*e* is connected to a transmitter unit 4*e* and receiver unit 7*e* for providing a two-way communication liaison. For example, terminal J corresponds to a trunk circuit external to the exchange 1 connected to an incoming trunk circuit 2*j*–3*j* of exchange 1. Terminal G corresponds to an outgoing trunk circuit exterior to exchange 1 connected to outgoing 2*g*–3*q* of exchange 1.

Circuit 2*h*–3*h* is utilized for signalling purpose via radio channel by the system computer CPU 10. Circuit or circuit assembly 2*s*–3*s* is for example, located outside of exchange 1 and is capable of communicating with terminal circuits of exchange 1. For that purpose its transmission antennas 5*s*1 and reception antennas 5*s*2 are located within room 6 and they are for example, connected by coaxial cables to transmitter 4*s* and receiver 7*s* respectively, transmitter 4*s* being located close to circuit 2*s*–3*s* as well as possibly receiver 7*s*.

In a preferred embodiment, transmitters 4 and receivers 7 are identically provided with synthesizers 8 and 9. However, only synthesizers 9 of receiver units 7 are switched for each communication concerning them via a distributor 18 and the fast multiplex channel 12 transmitting to each of them digital information indicating the frequency to which they have to be tuned for the concerned communication.

Synthesizers 8 may possibly be tuned on new frequencies either manually or via linkage 13 of the same type as 12 but possibly less performing, and by means of a distributor 17.

In the case of the remote circuit 2*s*–3*s*, the various necessary information is transmitted via a semaphore linkage 14 connecting control circuit 10' associated with 2*s*–3*s* to computer CPU 10 via transmission circuits 15 and 16.

In the preferred embodiment, detection of an off-hook condition at a local subscriber is made in a conventional manner through a scanner 21 connected to terminal circuits 2–3 by linkage 22, those circuits 2–3 being assumed to be subscriber line circuits when they are connected to subscriber sets. When receiving a call indication, scanner 21 transmits coding line identity information to CPU 10. CPU 10 assigns a free dialing junctor, such as 2*h*–3*h*, for handling the call. Each dialing junctor is connected to a transmitter unit and to a receiver unit, such as 2*h*–3*h* to 4*h* and 7*h*. In the case of a call of subscriber E handled by dialing junctor 2*h*–3*h*, receiver units 7*e* and 7*h* are respectively tuned to frequencies *fh* and *fe* of units 4*h* and 4*e* as a result of tuning orders from computer assembly 10, as transmitted by linkage 12.

Dialing junctor 2*h*–3*h* controls the transmission of the dial tone from transmitter 4*h* to receiver 7*e* tuned to frequency *fh*. Dialing signals delivered from calling set E corresponding to the called set telephone number are then transmitted in the form of modulation of transmission frequency *fe* of unit 4*e*, and receiver 7*h* transmits those dialing signals to junctor 2*h*–3*h* which in turn transmits the necessary information to computer assembly 10 via interface CPU 10 has a memory storing the list of the exchange subscriber sets and junctors with data concerning their respective free/busy conditions obtained through scanner 21 and linkage 22 in a conventional manner.

Depending on the nature of the call and of free/busy condition of the called subscriber, computer 10 causes a busy tone to be transmitted by radio channel to the calling set via junctor 2*h*–3*h* and transmitter unit 4*h* or a tuning control to be transmitted to units 7 via fast muliplex channel 12.

If the called subscriber is a local exchange subscriber, receiver units of the two sets to be connected are tuned to the involved transmission frequencies, such as receiver 7*e* to frequency *fj* and receiver 7*j* to frequency *fe*, through distributor 18 and linkage 12 assuming that terminal J now represents a local subscriber. If the called subscriber is located outside of the exchange 1, an outgoing junctor will be necessary and the radio connection will be established between that outgoing junctor and the calling set by tuning the involved receiver units to involved transmission frequencies, such as receiver 7*e* to frequency *fg* and receiver 7*g* to frequency *fe*. For dialing transfer reasons it may be necessary to temporarily connect the outgoing junctor to a subsidiary junctor arranged as 2*h*–3*h* which is in charge of sending signalling to remote junctor during the course of the completion of the call connection.

While the principles of the present invention have hereabove been described in relation with a specific embodiment, it will be clearly understood that the said description has only been by way of example and does not limit the scope of this invention.

What is claimed is:

1. A switching network for use in an exchange of a telecommunications system comprised of incoming, outgoing and local terminal circuits, said switching network comprised of a group of units including at least one radio transmitter unit and a second group including at least one radio receiver unit, said terminal circuits having connection to respective ones of said radio units for completion of intermediate paths thereto, and means for tuning one of the radio units of one group to the same frequency as a radio unit of said other group to thereby complete a radio linkage between the tuned units, responsive to the completion of an intermediate path from a terminal circuit to a radio unit of one group to complete a path over said linkage to another terminal circuit, and wherein said units each have an antenna which is contained in an enclosed space electromagnetically isolating said antennae from outside interference.

2. A switching network as claimed in claim 1, wherein one group comprises a plurality of radio transmitter units each of which is equipped with antenna, and another group comprises a plurality of radio receiver units each of which is equipped with an antenna, and each of said radio units is coupled to one of said terminal circuits.

3. A switching network as claimed in claim 2, wherein said enclosing space comprises a switching room which is anechoic as far as radio transmissions are concerned and wherein the receiver unit antennas are in direct line of sight with transmitter unit antennas.

4. A switching network as claimed in claim 3, wherein the distance from any transmitter unit antenna to any receiver unit antenna inside the switching room is substantially constant.

5. A switching network as claimed in claim 4, wherein the shape of the switching room is elongated and wherein the transmitter unit antennas are arranged at one end of the room while receiver unit antennas are arranged at the other end.

6. A switching network as claimed in claim 2, wherein the frequency selected for a radio connection from a transmitter unit to a receiver unit is a fixed characteristic of one of those two units wherein the other unit is tuned to that frequency by a control means for the radio linkage.

7. A switching network as claimed in claim 2, wherein each terminal circuit is connected to both a predetermined transmitter unit and a predetermined receiver unit.

8. A switching network as claimed in claim 7, wherein there is control means with at least one local terminal circuit connected to the control means to enable signalling information to be exchanged between the control means and incoming and outgoing terminal circuits via the radio channel within the switching room.

9. A switching network as claimed in claim 2, wherein at least one terminal circuit is located outside the exchange and at least one of its radio units is connected by coupling to antennas located inside the exchange switching room.

10. A switching network for an exchange of a telecommunications system wherein there are a first plurality of terminal circuits connected to local telephone sets, and a second plurality of incoming and outgoing terminal circuits providing paths into and out of said exchange, a plurality of radio receiver units and a plurality of radio transmitter units, with said units tunable onto certain frequencies, each such terminal circuit including means for linking the respective circuit to a receiver unit or a transmitter unit, each unit having coupled thereto an antenna, an enclosing structure surrounding said antennae to isolate said antennae from the intrusion of radio waves from outside said structure, and means for tuning one unit of one plurality to a frequency to which a unit of the other plurality is tuned to complete a radio channel between the tuned units and complete a conversation path between a terminal circuit of said first plurality and a terminal circuit of said second plurality.

11. A network as claimed in claim 10, wherein said channel is used for the one-way transmission of information between terminal circuits of said tuned units, and wherein a second transmitter unit and receiver unit are tuned to a second frequency for providing two-way transmission of information between the terminal circuits linked to the respective second transmitter unit ad receiver unit.

* * * * *